United States Patent Office 3,298,361
Patented Jan. 17, 1967

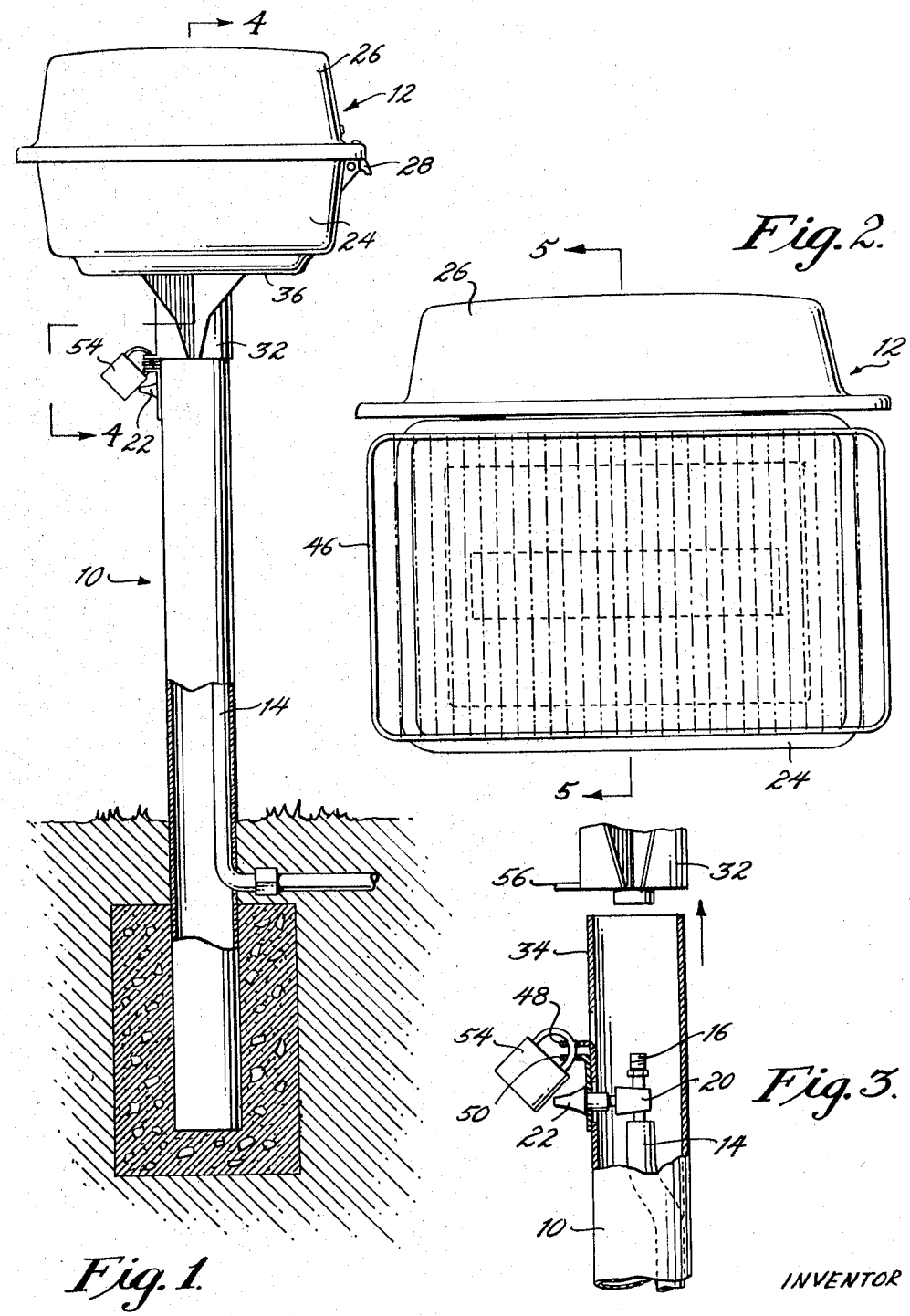

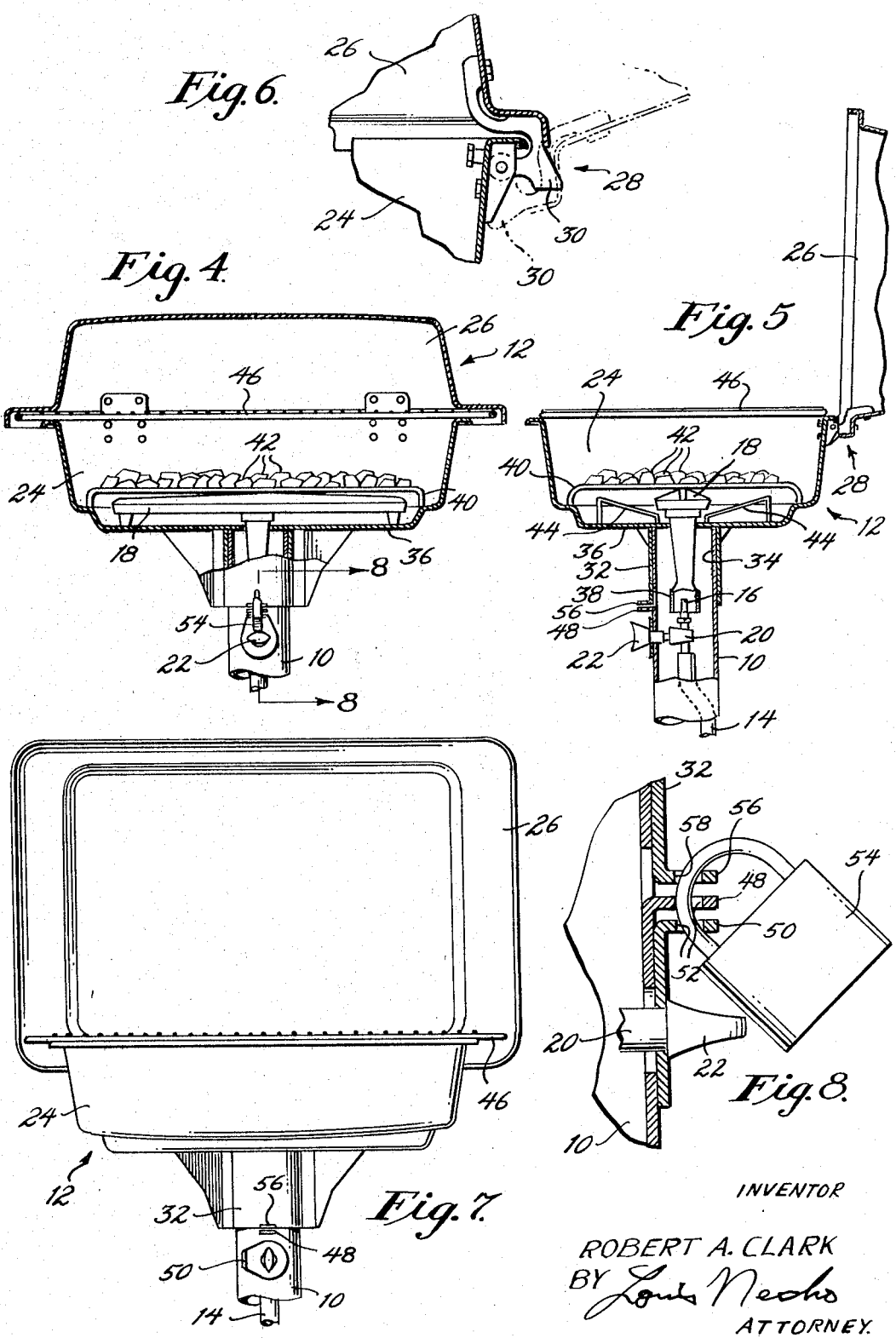

3,298,361
OUTDOOR COOKING APPARATUS
Robert A. Clark, Allentown, Pa., assignor to Caloric Corporation, Topton, Pa., a corporation of Pennsylvania
Filed Sept. 23, 1965, Ser. No. 489,641
4 Claims. (Cl. 126—25)

This invention relates to a cooking apparatus.

More specifically, it relates to a cooking apparatus which is adaptable for outdoor use and which includes a permanently mounted and secured pedestal and a detachable and interchangeable cooking unit carried by said pedestal.

One object of this invention is to provide an improved cooking apparatus of the type set forth.

One problem encountered with an outdoor cooking apparatus of the type set forth is unauthorized use or tampering.

A further object is to provide means for rendering the cooking apparatus inoperable by unauthorized persons.

Another problem encountered with a cooking device of the type set forth is that on windy days, a breeze may cool the food or may blow leaves or other undesirable materials onto the food.

It is therefore a still further object to provide a cooking apparatus, the cooking unit of which can be rotated in relation to the support pedestal.

A still further object is to provide an improved cooking apparatus which is durable, weatherproof and easy to operate.

The full nature of this invention will be understood from the following specifications and the accompanying drawings in which:

FIG. 1 is a view partly in section and partly in side elevation of a cooking apparatus embodying the invention.

FIG. 2 is a top plan view of the apparatus shown in FIG. 1.

FIG. 3 is an enlarged view, partly in elevation and partly in section showing the removable connection of a cooking unit to the permanently mounted pedestal.

FIG. 4 is a sectional view looking in the direction of line 4—4 on FIG. 1.

FIG. 5 is a sectional view looking in the direction of line 5—5 on FIG. 2.

FIG. 6 is an enlargement of the hinge mechanism which is shown in FIG. 5.

FIG. 7 is a left-hand elevational view of FIG. 5.

FIG. 8 is a sectional view looking in the direction of line 8—8 on FIG. 4.

A cooking apparatus embodying the invention includes a permanently secured pedestal 10 and a removable cooking unit 12. The pedestal is secured in position outdoors by being imbedded in a concrete foundation as shown in FIG. 1. Within pedestal 10 is a pipe 14 which extends underground to a source of gaseous fuel not shown. The upper end 16 of pipe 14 supplies gas to a burner 18 subject to the control of a valve 20 which is operated by handle 22. Burner 18 may be carried by pedestal 10 but, in the preferred embodiment it is carried by, or forms part of the cooking unit.

The cooking unit includes a receptacle 24 and a cover 26 which is connected to the receptacle by a hinge 28. The hinge may be a conventional type but, in the preferred embodiment, it includes a stop 30 which, when the cover is opened to the position of FIG. 5, abuts the side of receptacle 24 to limit the movement of the cover in opening direction as shown in phantom in FIG. 6.

The cooking unit further includes a pendent sleeve 32 which is adapted, snugly and rotatably, to slide over the upper end 34 of pedestal 10. It will be observed that when the cooking unit is lowered onto the pedestal until the bottom 36 of receptacle 24 comes to rest on the top edge of the pedestal, the throat 38 of the venturi, or fuel mixing chamber of the burner, will overlie end 16 so as to receive gaseous fuel when the valve handle 22 is turned to the open position of FIGS. 5 and 7.

The cooking unit is provided with a grid 40 or the like for supporting ceramic chips 42 which are heated by the burner. Below the grid there is preferably provided reflecting plates 44 for reflecting infrared and other heat rays toward the food which is placed on a grill 46 which is supported by receptacle 24. The cooking unit may be for frying, roasting, broiling or baking or a rotisserie may be substituted.

In order to prevent unauthorized use of, or tampering with, the cooking apparatus, pedestal 10 has a tab 48 secured to its outer wall and handle 22 is provided with a tab 50, said tabs each having an opening 52, as shown in FIGS. 3 and 5. As will be seen from FIGS. 5 and 7, when the handle 22 is turned to gas "on" position, tab 50 will be moved out of registration with tab 48. But when the handle is in gas "off" position as shown in FIGS. 3 and 4, holes 52 of tabs 48 and 50 register, thereby permitting the hasp of lock 54 to be passed through both openings, as shown in FIG. 3, thus preventing gas valve 22 from being turned on.

Since the cooking unit 12 is detachably mounted upon post 14, it is necessary to prevent said cooking unit from being stolen by vandals. To accomplish this, sleeve 32 is provided with a tab 56 having an opening 58 which is registerable with openings 52 so as to receive the hasp of lock 54, as shown in FIG. 8, thus securing the cooking unit against unauthorized removal and rendering the gas valve inoperable.

The operation of the invention is as follows:

The cooking unit 12 is placed upon pedestal 10, with venturi 38 fitting over upper end 16 of fuel conduit 14. Lock 54 is removed from tabs 48 and 50 thus allowing handle 22 to turn thereby providing gaseous fuel for burner 18. The burner is lit in the conventional way. The cooking unit may be rotated upon said pedestal to a position whereby cover 26 acts as a windbreak. When the cooking operation is completed, the burner may be left on until all the grease is burned off the ceramic chips. When the cooking apparatus is not in use, lock 54 is passed through the tabs connected to the cooking unit, the pedestal and the gas valve handle respectively, thus securing the cooking unit against theft and rendering the gas valve inoperable. If desired, the cooking unit can be removed for storage, in which case only the pedestal tab and the gas valve tab will be locked. The cooking apparatus can easily be covered with a tarpaulin or the like, when not in use.

What we claim is:

1. A cooking apparatus including:
   a hollow pedestal adapted to be permanently mounted and secured in position,
   a cooking unit including a burner, connecting means for detachably mounting said cooking unit on said pedestal,
   a fuel supply conduit disposed in said pedestal and leading to the burner,
   a valve intermediate said conduit and said burner,
   a handle for opening and closing said valve,
   a tab carried by said handle and having an opening therein, and
   a tab carried by said pedestal and having an opening therein,
   said tabs being aligned with one another when the handle is in valve-closing position to receive a locking device and being out of alignment when the handle is in valve-opening position.

2. The apparatus recited in claim 1 and a tab carried by said connecting means and having an opening therein for receiving said locking device.

3. A cooking apparatus including:
   a receptacle,
   a cover therefore,
   a hinge connecting said cover to said receptacle whereby said cover is movable to a substantially vertical open position or to a substantially horizontal closed position,
   a grid in the lower portion of the receptacle for supporting non-combustible heat absorbing and raidating material,
   a burner within said receptacle and below said grid for heating said material,
   reflecting plates below the burner for reflecting heat upwards toward said material,
   a hollow pedestal,
   a sleeve carried by said cooking unit and adapted snugly and rotatably over said pedestal,
   a fuel conduit extending upwardly within said pedestal,
   a valve connected to said conduit for regulating the flow of fuel therethrough,
   a venturi connected to said burner and adapted to fit over the upper end of said conduit,
   a handle for opening and closing said valve,
   a tab carried by said handle having an opening therein,
   a tab carried by said pedestal having an opening therein,
   said tabs being aligned with one another when the handle is in valve-closing position to receive a locking device and being out of alignment when handle is in valve-opening position, and
   a tab carried by said sleeve and having an opening therein,
   said tab being alignable with said pedestal tab to receive said locking device.

4. The apparatus recited in claim 3 and a stop carried by said hinge and adapted to abut a side of said receptacle to limit the movement of said cover in opening direction.

References Cited by the Examiner
UNITED STATES PATENTS

| | | | |
|---|---|---|---|
| 2,482,068 | 9/1949 | Larson | 126—25 |
| 3,053,245 | 9/1962 | Beller | 126—25 |
| 3,127,888 | 4/1964 | Burnham et al. | 126—25 |
| 3,244,163 | 4/1966 | McGlaughlin | 126—25 |

FREDERICK L. MATTESON, JR., *Primary Examiner.*

E. G. FAVORS, *Assistant Examiner.*